United States Patent [19]

Nakanishi et al.

[11] Patent Number: 4,466,398

[45] Date of Patent: Aug. 21, 1984

[54] FLOW CONTROL DEVICE OF A HELICALLY-SHAPED INTAKE PORT

[75] Inventors: Kiyoshi Nakanishi; Takeshi Okumura, both of Susono; Tokuta Inoue, Mishima, all of Japan

[73] Assignee: Toyota Jidosha Kabushiki Kaisha, Aichi, Japan

[21] Appl. No.: 400,358

[22] Filed: Jul. 21, 1982

[30] Foreign Application Priority Data

Jul. 31, 1981 [JP] Japan .................................. 119319

[51] Int. Cl.³ ...................... F02B 31/00; F02M 35/10
[52] U.S. Cl. ................................. 123/188 M; 123/306
[58] Field of Search ............... 123/188 M, 306, 308, 123/52 M, 432

[56] References Cited

U.S. PATENT DOCUMENTS

| | | | |
|---|---|---|---|
| 3,850,479 | 11/1974 | Boyhont et al. | 302/29 |
| 4,174,686 | 11/1979 | Shimizu et al. | 123/188 M |
| 4,196,701 | 4/1980 | Tamura et al. | 123/188 M |
| 4,201,165 | 5/1980 | Tanaka et al. | 123/568 |
| 4,253,432 | 3/1981 | Nohira et al. | 123/52 M |
| 4,256,062 | 3/1981 | Schafer | 123/52 M |
| 4,257,384 | 3/1981 | Matsumoto | 123/575 |
| 4,312,309 | 1/1982 | Nakanishi et al. | 123/188 M |
| 4,347,816 | 9/1982 | Saito et al. | 123/308 |

FOREIGN PATENT DOCUMENTS

| | | | |
|---|---|---|---|
| 2059008 | 6/1972 | Fed. Rep. of Germany . | |
| 143289 | 8/1980 | German Democratic Rep. | 123/188 M |
| 52-127113 | 9/1977 | Japan . | |
| 58129 | 5/1979 | Japan . | |
| 19945 | 2/1980 | Japan | 123/308 |
| 54922 | 5/1981 | Japan . | |
| 68519 | 4/1982 | Japan . | |

Primary Examiner—Craig R. Feinberg
Assistant Examiner—W. R. Wolfe
Attorney, Agent, or Firm—Parkhurst & Oliff

[57] ABSTRACT

A helically-shaped intake port comprising a helical portion formed around an intake valve, and a substantially straight inlet passage portion tangentially connected to the helical portion. A bypass passage is branched off from the inlet passage portion and connected to the helical portion. A slide valve is arranged in the bypass passage and controlled by an electronic control unit so that the opening area of the slide valve is proportional to the amount of air fed into the cylinder of the engine.

17 Claims, 18 Drawing Figures

FLOW CONTROL DEVICE OF A HELICALLY-SHAPED INTAKE PORT

BACKGROUND OF THE INVENTION

The present invention relates to a flow control device of a helically-shaped intake port of an internal combustion engine.

A helically-shaped intake port normally comprises a helical portion formed around the intake valve of an engine, and a substantially straight inlet passage portion tangentially connected to the helical portion. However, if such a helically-shaped intake port is so formed that a strong swirl motion is created in the combustion chamber of an engine when the engine is operating at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

In order to eliminate such a problem, the inventor has proposed a flow control device in which a bypass passage, branched off from the inlet passage portion and connected to the helix terminating portion of the helical portion, is formed in the cylinder head of an engine. A normally closet type flow control valve, actuated by an actuator, is arranged in the bypass passage and opened under the operation of the acutator when the amount of air fed into the cylinder of the engine is larger than a predetermined amount. In this flow control device, when the amount of air fed into the cylinder of the engine is large, that is, when the engine is operating under a heavy load at a high speed, a part of the air introduced into the inlet passage portion is fed into the helical portion of the helically-shaped intake port via the bypass passage. This reduces the flow resistance of the helically-shaped intake port, and thus, enables high volumetric efficiency. This flow control device, however, is just the embodiment of the basic principle of operation. In order to create an optimum swirl motion in the combustion chamber of the engine while obtaining a high volumetric efficiency, it is necessary to precisely control the amount of air fed into the helical portion from the bypass passage.

SUMMARY OF THE INVENTION

An object of the present invention is to provide a flow control device capable of creating an optimum swirl motion while obtaining a high volumetric efficiency.

According to the present invention, there is provided a device for controlling the flow in a helically-shaped intake port of an internal combustion engine, a said intake port comprising a helical portion formed around an intake valve, and a substantially straight inlet passage portion tangentially connected to the helical portion and having a helix terminating portion, said device comprising: a bypass passage branched off from the inlet passage portion and connected to the helix terminating portion of the helical portion, a slide valve transversely movable in said bypass passage for controlling the flow area of said bypass passage; and actuating means actuating said slide valve in response to a change in the amount of air fed into the intake port for increasing the flow area of said bypass passage in proportion to an increase of said amount of air.

The present invention may be more fully understood from the description of preferred embodiments of the invention set forth below, together with the accompanying drawings.

DESCRIPTION OF PREFERRED EMBODIMENTS

Figure 1:
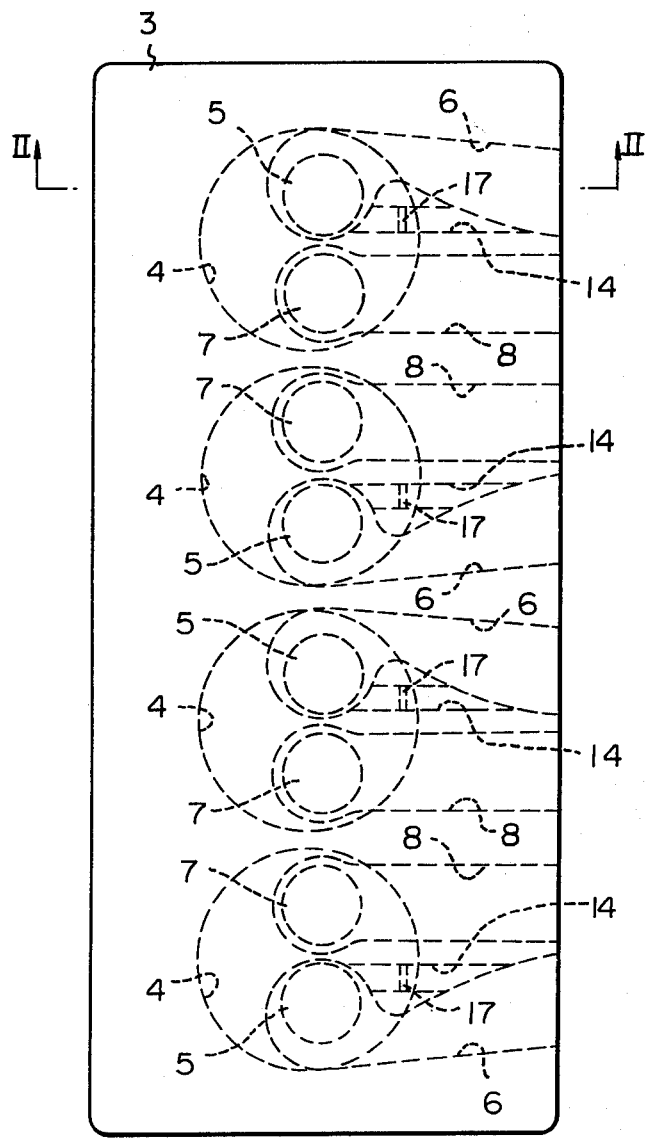
FIG. 1 is a plan view of an internal combustion engine according to the present invention.
Figure 2:
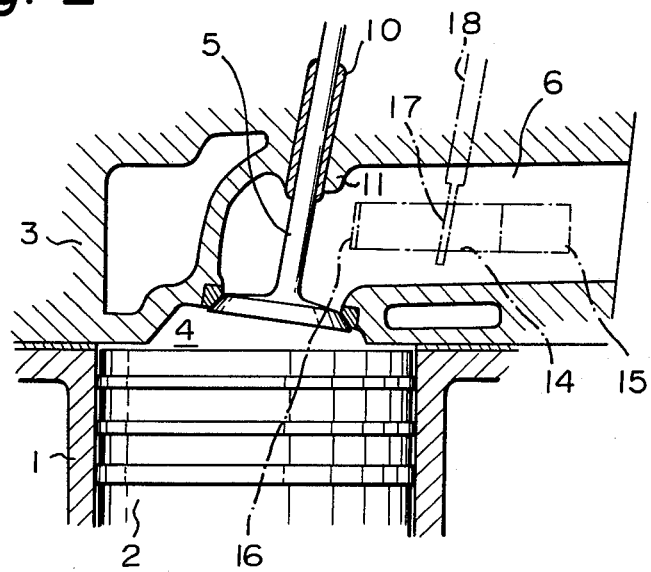
FIG. 2 is a cross-sectional view taken along the line II—II in FIG. 1.

Referring to FIGS. 1 and 2, reference numeral 1 designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head, 7 an exhaust valve, and 8 an exhaust port formed in the cylinder head 3. A spark plug (not shown) is arranged in the combustion chamber 4.

Figure 3:
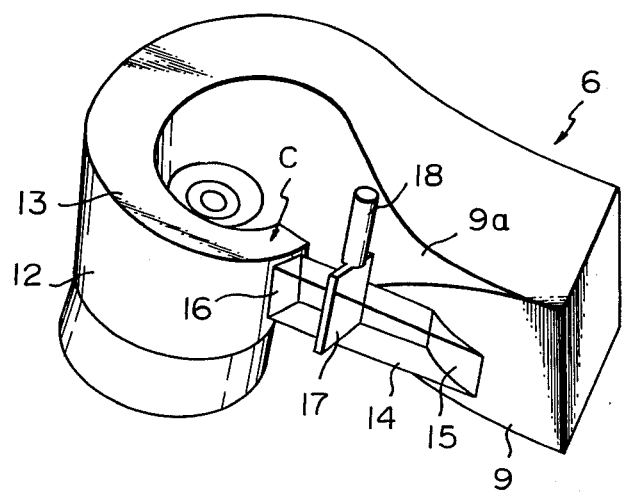
FIG. 3 is a perspective view schematically illustrating the shape of a helically shaped-intake port.
Figure 4:
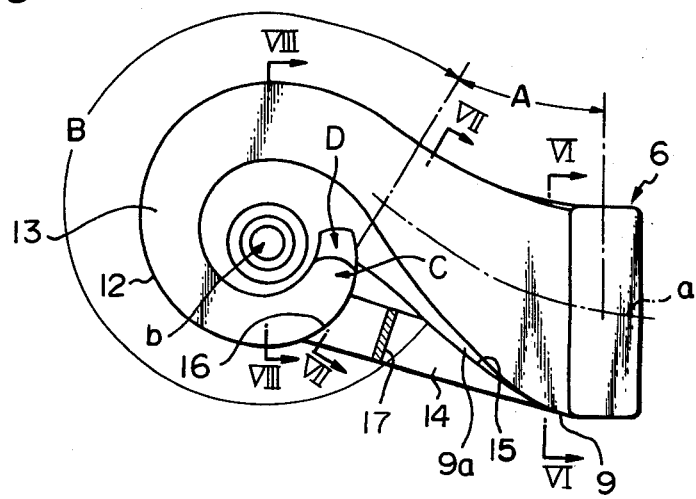
FIG. 4 is a plan view of FIG. 3.
Figure 5:
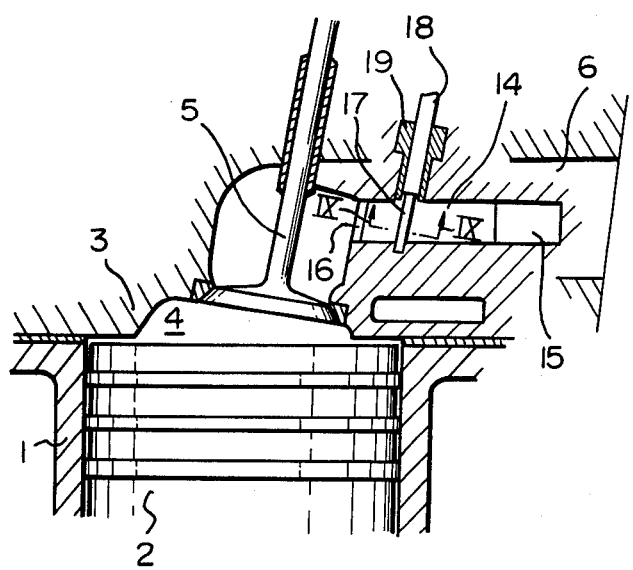
FIG. 5 is a cross-sectional view taken along the bypass passage in FIG. 3.
Figure 6:
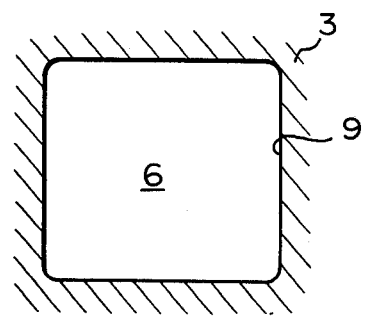
FIG. 6 is a cross-sectional view taken along the line VI—VI in FIG. 4.
Figure 7:
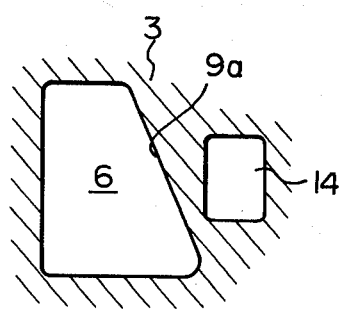
FIG. 7 is a cross-sectional view taken along the line VII—VII in FIG. 4.
Figure 8:
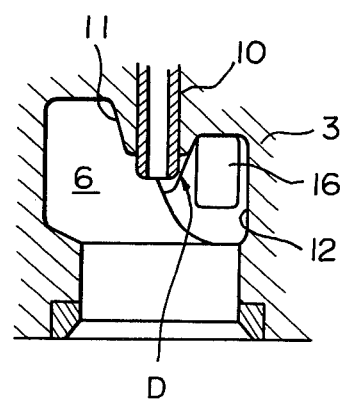
FIG. 8 is a cross-sectional view taken along the line VIII—VIII in FIG. 4.
Figure 9:
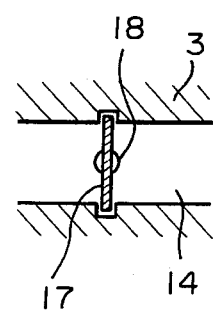
FIG. 9 is a cross-sectional view taken along the line IX—IX in FIG. 5.

FIGS. 3 and 4 schematically illustrate the shape of the helically-shaped intake port 6 illustrated in FIG. 2. As illustrated in FIG. 4, the helically-shaped intake port 6 comprises an inlet passage portion A the longitudinal central axis of which is slightly curved, and a helical portion B formed around the valve stem of the intake valve 5. The inlet passage portion A is tangentially connected to the helical portion B. As illustrated in FIGS. 3, 4, and 7, the side wall 9 of the inlet passage portion A, which is located near the helix axis b, has on its upper portion an inclined wall portion 9a which is arranged to be directed downwards. The width of the inclined wall portion 9a is gradually increased towards the helical portion B and, as is illustrated in FIG. 7, the entire portion of the side wall 9 is inclined at the connecting portion of the inlet passage portion A and the helical portion B. The upper half of the side wall 9 is smoothly connected to the circumferential wall of a cylindrical projection 11 (FIG. 2) which is formed on the upper wall of the intake port 6 at a position located around a valve guide 10 of the intake valve 5. The lower half of the side wall 9 is connected to the side wall 12 of the helical portion B at the helix terminating portion C of the helical portion B. In addition, the upper wall 13 of the helical portion B is connected to a steeply inclined wall D at the helix terminating portion C of the helical portion B.

As illustrated in FIGS. 1 through 5, bypass passages 14, branched off the inlet passage portions A of the corresponding intake ports 6 and having a rectangular cross-section, are formed in the cylinder head 3, and each of the bypass passages 14 is connected to the helix terminating portion C of the corresponding intake port 6. Each of the inlet openings 15 of the bypass passages 14 is formed on the side wall 9 at a position located near the inlet open end of the inlet passage portion A of the corresponding intake port 6. Each of the outlet openings 16 of the bypass passages 14 is formed on the upper end portion of the side wall 12 at the helix terminating portion C of the corresponding intake part 6. In addition, slide valves 17 for controlling the flow areas of the corresponding bypass passages 14 are slidably arranged in the corresponding bypass passages 14. Valve rods 18 are formed in one piece on the upper ends of the corresponding slide valves 17, and the upper end portions of the valve rods 18 extend through corresponding guide sleeves 19 fitted into the cylinder head 3 and project upwardly from the cylinder head 3.

Figure 10:
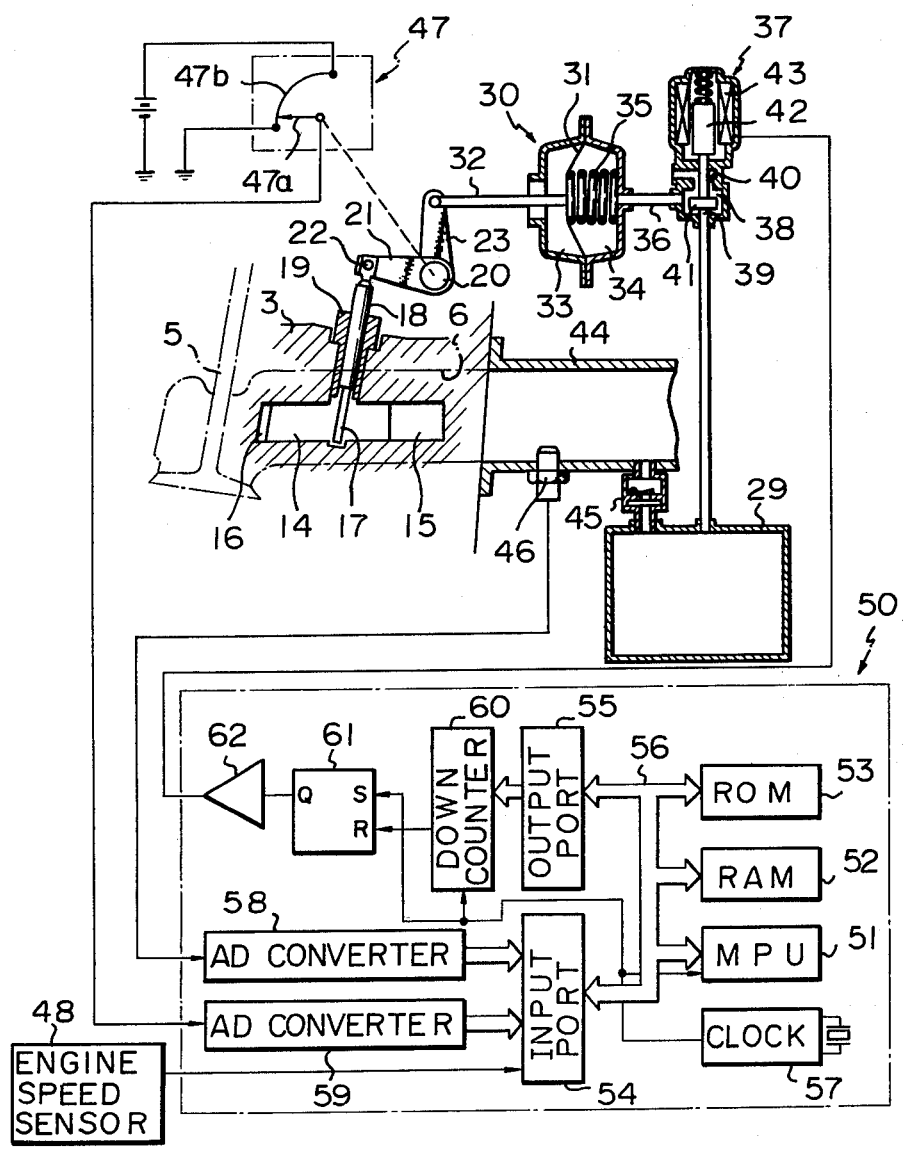
FIG. 10 is a view of the entirety of a flow control device.

As illustrated in FIG. 10, an arm rod 20 is rotatably mounted on the cylinder head 3 via the bearings (not shown), and arms 21 provided for the slide valves 17 of the corresponding cylinders are fixed onto the arm rod 20. The tips of the arms 21 are pivotally connected to the tops of the corresponding valve rods 18 via pivot pins 22. In addition, an arm 23 is fixed onto the arm rod 20, and the tip of the arm 23 is connected to a control rod 32 which is fixed onto a diaphragm 31 of a vacuum operated diaphragm apparatus 30. The diaphragm apparatus 30 comprises a vacuum chamber 34 and an atmospheric pressure chamber 33 which are separated by the diaphragm 31, and a compression spring 35 for biasing the diaphragm 31 is inserted into the vacuum chamber 34. The vacuum chamber 34 is connected to a vacuum accumulator 29 via a vacuum conduit 36 and an electronic control valve 37. The electromagnetic control valve 37 comprises a valve chamber 38, a vacuum port 39 connected to the vacuum accumulator 29, an atmosphere port 40 being open to the atmosphere, a valve body 41 for controlling the opening operation of the vacuum port 39 and the atmosphere port 40, a movable plunger 42 connected to the valve body 41, and a solenoid 43 for attracting the movable plunger 42. The solenoid 43 is connected to the output terminal of an electronic control unit 50. On the other hand, an intake pipe 44 is connected to the intake port 6, and the carburetor (not shown) is mounted on the intake pipe 44. The vacuum accumulator 29 is connected to the intake pipe 44 via a check valve 45 which allows only the outflow of air from the vacuum accumulator 29 into the intake pipe 44. The check valve 45 opens when the level of vacuum in the intake pipe 44 becomes greater than that of the vacuum in the vacuum accumulator 29, and the check valve 45 closes when the level of vacuum in the intake pipe 44 becomes smaller than that of the vacuum in the vacuum accumulator 29. Consequently, the level of vacuum in the vacuum accumulator 29 is maintained at a maximum vacuum which has been produced in the intake pipe 44. A vacuum sensor 46 for detecting the level of vacuum produced in the intake pipe 44 is mounted on the intake pipe 44 and connected to the input terminal of the electronic control unit 50. In addition, a potentiometer 47 for detecting the flow area of the bypass passage 14 is mounted on the arm rod 20. The potentiometer 47 comprises a slider 47a connected to the arm rod 20 and rotating together with the arm rod 20, and a stationary resistor 47b. The slider 47a slides on the stationary resistor 47b while contacting with it. Consequently, a voltage, which is proportional to the opening area of the slide valve 17, is applied to the slider 47a. The slider 47a is connected to the input terminal of the electronic control unit 50. In addition, an engine speed sensor 48 for detecting the rotating speed of the crankshaft (not shown) of the engine is connected to the input terminal of the electronic control unit 50.

The electronic control unit 50 is constructed as a digital computer and comprises a microprocessor (MPU) 51 carrying out the arithmetic and logic processing, a random-access memory (RAM) 52, a read-only memory (ROM) 53 storing a predetermined control program and arithmetic constant therein, an input port 54 and an output port 55. The MPU 51, the RAM 52, the ROM 53, the input port 54, and the output port 55 are interconnected to each other via a bidirectional bus 56. In addition, the electronic control unit 50 comprises a clock generator 57 generating various clock signals. As illustated in FIG. 10, the vacuum sensor 46 and the potentiometer 47 are connected to the input port 54 via AD converters 58 and 59, respectively, and the engine speed sensor 48 is connected to the input port 54. The vacuum sensor 46 produces an output voltage which is proportional to the level of vacuum produced in the intake pipe 44. The output voltage of the vacuum sensor 46 is converted to the corresponding binary code in the AD converter 58, and the binary code is input into the MPU 51 via the input port 54 and the bus 56. The potentiometer 47 produces an output voltage which is proportional to the opening area of the slide valve 17. The output voltage of the potentiometer 47 is converted to the corresponding binary code in the AD converter 59, and the binary code is input into the MPU 51 via the input port 54 and the bus 56. The engine speed sensor 48 produces an output pulse everytime the crankshaft (not shown) of the engine rotates by a fixed angle, and the output pulse of the engine speed sensor 48 is input into the MPU 51 via the input port 54 and the bus 56.

The output port 55 is provided for outputtting data necessary to actuate the electromagnetic control valve 37, and binary coded date is written in the output port 55 from the MPU 51 via the bus 56. The output terminals of the output port 55 are connected to the corresponding input terminals of a down counter 60. The down counter 60 is provided for converting the binary coded data, written in the output port 55 to the corresponding length of time. That is, the down count of the binary coded data fed into the down counter 60 from the output port 55 is started by the clock signal of the clock generator 57. After this, when the content of the down counter 60 becomes equal to zero, the down count of the binary coded data is completed, and the down count completion signal is produced at the output terminal of the down counter 60. The reset input terminal R of a S-R flip-flop 61 is connected to the output terminal of the down counter 60, and the set input terminal S of the S-R flip-flop 61 is connected to the clock generator 57. The S-R flip-flop 61 is set by the clock signal of the clock generator 57 at the same time the down count of the down counter 60 is started, and the S-R flip-flop 61 is reset by the down count completion signal of the down counter 60 at the same time of the completion of the down count of the down counter 60. Consequently, the output voltage, produced at the output terminal Q of the flip-flop 61, becomes high during the time the down count of the down counter 60 is carried out. The output terminal Q of the flip-flop 61 is connected to the electromagnetic control valve 37 via a power amplifier 62. Consequently, it is understood that the solenoid 43 of the electromagnetic control valve 37 is energized during the time the down count of the down counter 60 is carried out.

When the solenoid 43 of the electromagnetic control valve 37 is de-energized, since the valve body 41 opens the atmosphere port 40 and closes the vacuum port 39 as illustrated in FIG. 10, the pressure in the vacuum chamber 34 of the diaphragm apparatus 30 becomes equal to the atmospheric pressure. At this time, since the diaphragm 31 moves towards the left in FIG. 10 due to the spring force of the compression spring 35, the slide valve 17 shuts off the bypass passage 14. On the other hand, when the solenoid 43 of the electromagnetic control valve 37 is energized, since the valve body 41 closes the atmosphere port 40 and opens the vacuum port 39, vacuum in the vacuum accumulator 29 acts on the vacuum chamber 34 of the diaphragm apparatus 30. At this time, since the diaphragm 31 moves towards the rihgt in FIG. 10 against the compression spring 35, the slide valve 17 moves upward, and thus, the slide valve 17 opens the bypass passage 14 to the maximum extent. As mentioned previously, the solenoid 43 of the electromagnetic control valve 37 is energized during the time the down count of the down counter 60 is carried out, that is, when a voltage, produced at the output terminal Q of the S-R flip-flop 61, becomes high. Consequently, the length of time during which the valve body 41 of the electromagnetic control valve 37 opens the vacuum port 39 and closes the atmosphere port 40 is proportional to the duty cycle of a pulse applied to the solenoid 43. As the length of time during which the valve body 41 opens the vacuum port 39 and closes the atmosphere port 40 becomes long, the level of vacuum in the vacuum chamber 34 of the diaphragm apparatus 30 becomes great, and thus, the opening area of the slide valve 17 becomes large. Consequently, it is understood that the opening area of the slide valve 17 becomes large as the duty cycle of a pulse applied to the solenoid 43 becomes large.

Figure 13:
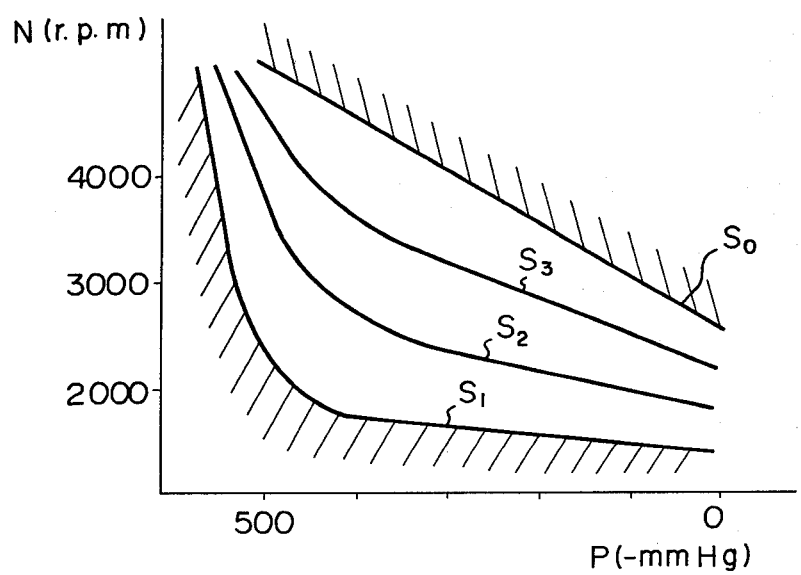
FIG. 13 is a diagram illustrating the flow area of the slide valve.

FIG. 13 illustrates a preferable relationship between the opening area of the slide valve 17 and the engine operating condition determined by the engine speed and the vacuum produced in the intake pipe 44. In FIG. 13, the ordinate N indicates the engine speed (r.p.m), and the abscissa P indicates the vacuum (−mmHg) produced in the intake pipe 44. In addition, the upper region, illustrated by the hatching above the solid line $S_0$, indicates a region where the slide vlave 17 opens the bypass passage 14 to the maximum extent, and the lower region, illustrated by the hatching below the solid line $S_1$, indicates a region where the slide valve 17 completely shuts off the bypass passage 14. Furthermore, the representively depicted two solid lines $S_2$ and $S_3$ indicate lines on which the opening area of the slide valve 17 is constant. In FIG. 13, the opening area of the slide valve 17 is gradually increased from $S_1$ towards $S_0$. The preferable relationship, illustrated in FIG. 13, between the opening area of the slide valve 23 and the engine operating condition determined by the engine speed N and the vacuum P, is stored in the ROM 53 in the form of a function or a data table.

Figure 11:
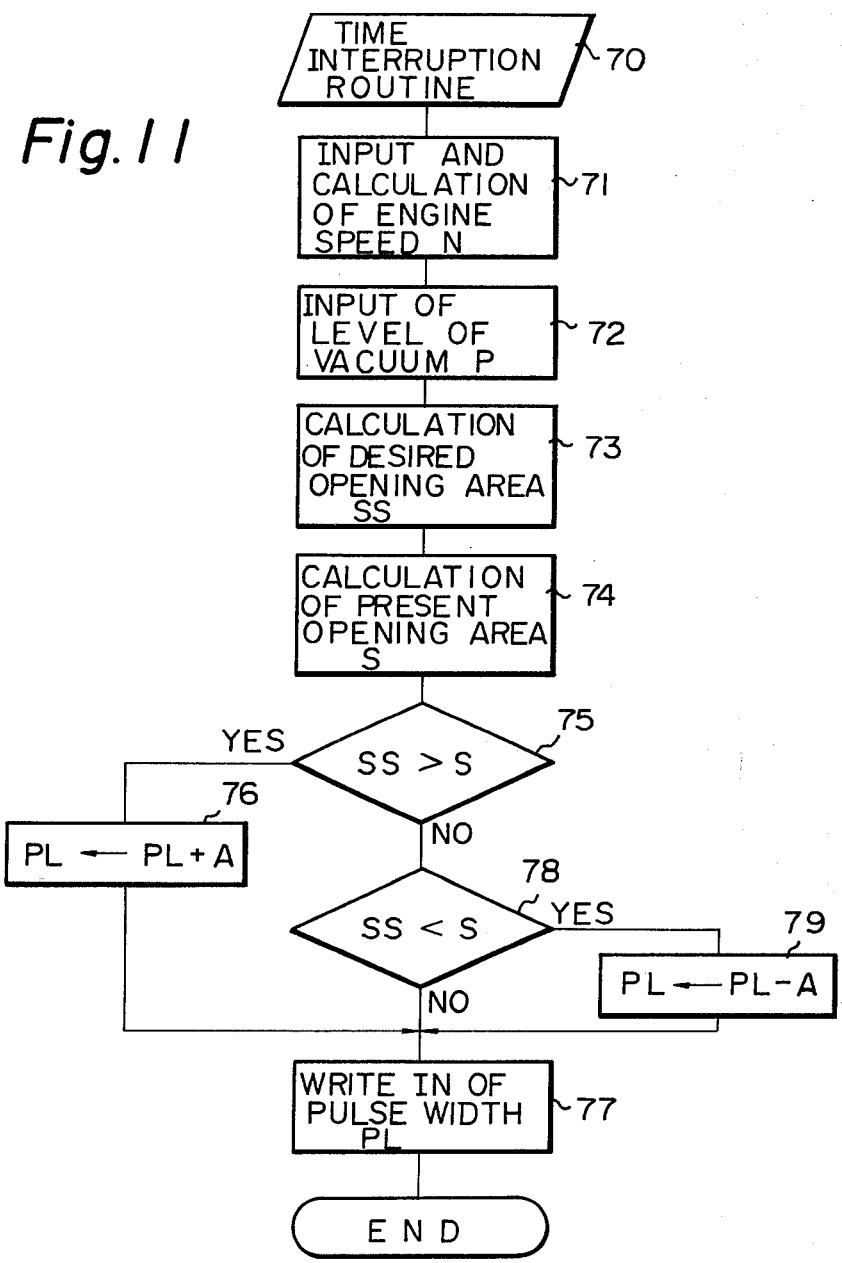
FIG. 11 is a flow chart for illustrating the operating of the flow control valve.

FIG. 11 illustrates a flow chart of the operation of a flow control device according to the present invention. Referring to FIG. 11, step 20 means that the routine is proceed by sequential interruptions which are executed every predetermined time. Initially, in step 71, the output signal of the engine speed sensor 48 is input into the MPU 51, and the engine speed N is calculated. Then, in step 72, the output signal of the vacuum sensor 46 is input into the MPU 51. Then, in step 73, the desired opening area SS of the slide valve 17 is calculated from the relationship illustrated in FIG. 13 and stored in the ROM 53 on the basis of the vacuum P and the calculated engine speed N. Then, in step 74, the output signal of the potentiometer 47 is input into the MPU 51, and the present opening area of the slide valve 17 is calculated. Then, in step 75, it is determined whether the desired opening area SS is larger than the present opening area S. If the desired opening area SS is larger than the present opening area S, the routine goes to step 76. In step 76, a fixed value A is added to the pulse width PL indicating the width of pulse which should be applied to the solenoid 43 of the electromagnetic control valve 37, and the result of the addition is put into the pulse width PL. Then, the routine goes to step 77. On the other hand, if it is determined in step 75 that the desired opening area SS is not larger than the present opening area S, the routine goes to step 78, and it is determined whether the desired opening area SS is smaller than the present opening area S. If it is determined in step 78 that the desired opening area SS is smaller than the present opening area S, the routine goes to step 79. In step 79, a fixed value A is subtracted from the pulse width PL, and the result of the subtraction is put into the pulse width PL. Then, the routine goes to step 77. On the other hand, if it is determined in step 78 that the desired opening area SS is not smaller than the present opening area S, the routine goes to step 77. In step 77, a binary coded data, corresponding to the pulse width PL thus obtained, is written in the output port 55, and the energizing operation of the solenoid 43 of the electromagnetic control valve 37 is carried out on the basis of the data written in the output port 55.

Figure 12:
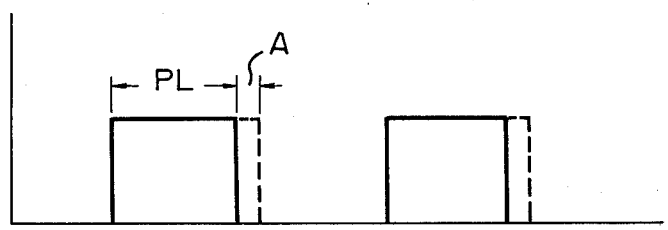
FIG. 12 is a diagram illustrating pulses applied to the solenoid of the electromagnetic control valve.

FIG. 12 illustrates pulses applied to the solenoid 43 of the electromagnetic control valve 37. The solenoid 43 is energized during the time these pulses are produced. As is be understood from the flow chart illustrated in FIG. 11, when the present opening area S of the slide valve 17 is smaller than the desired opening area SS, the pulse width PL is successively increased by the fixed value A until the opening area of the slide valve 17 becomes equal to the desired opening area SS. Consequently, since the duty cycle of the pulses applied to the solenoid 43 is gradually increased, the level of vacuum in the vacuum chamber 34 of the diaphragm apparatus 30 gradually increases to a high level. As a result of this, the slide valve 17 moves upward, and thus, the opening area of the slide valve 17 equals the desired opening area SS. As is be understood from FIG. 13, when the engine is operating at a low speed under a light load, at a low speed under a heavy load, and at a high speed under a light load, the output voltage of the S-R flip-flop 61 continuously decreases. As a result of this, since the solenoid 43 remains de-energized, the slide valve 17 continuously closes the bypass passage 14. On the other hand, when the engine is operating at a high speed under a heavy load, since the output voltage of the S-R flip-flop 61 continuously increases, the solenoid 43 remains energized, and thus, the slide valve 17 continuously opens the bypass passage 14 to the maximum extent.

As mentioned above, when the engine is operating at a low speed under a light load, at a low speed under a heavy load and at a high speed under a light load, that is, when the amount of air fed into the cylinder of the engine is small, the slide valve 17 closes the bypass passage 14. At this time the mixture introduced into the inlet passage portion A moves downward, while swirling, along the upper wall 13 of the helical portion B. Then, since the mixture while swirling flows into the combustion chamber 4, a strong swirl motion is created in the combustion chamber 4.

When the engine is operating at a high speed under a heavy load, that is, when the amount of air fed into the cylinder of the engine is large, since the slide valve 17 opens the bypass passage 14, a part of the mixture introduced into the inlet passage portion A is fed into the helical portion B via the bypass passage 14 having a low flow resistance. Since the flow direction of the mixture stream flowing along the upper wall 13 of the helical portion B is deflected downward by the steepling inclined wall D of the helix terminating portion C, a great vacuum is produced at the helix terminating portion C, that is, in the outlet opening 16 of the bypass passage 14. Consequently, since the pressure difference between the vacuum in the inlet passage portion A and the vacuum in the helix terminating portion C becomes large, a large amount of the mixture is fed into the helical portion B via the bypass passage 14 when the slide valve 17 opens. As mentioned above, when the engine is operating at a high speed under a heavy load, since the slide valve 17 opens, the entire flow area of the intake port 6 is increased, and a large amount of the mixture is fed into the helical portion B via the bypass passage 14 having a low flow resistance. As a result of this, it is possible to obtain a high volumetric efficiency. In addition, by forming the inclined wall portion 9a, the flow direction of a part of the mixture introduced into the inlet passage portion A is deflected downward. As a result of this, since the part of the mixture flows into the helical portion B along the bottom wall of the intake port 6 without swirling, the flow resistance of the intake port 6 becomes small, and thus, makes it possible to further increase a volumetric efficiency when the engine is operating at a high speed under a heavy load.

On the other hand, in the region between the solid lines $S_1$ and $S_0$ in FIG. 13, as the point on FIG. 13 which is determined by the engine speed N and the vacuum P moves from $S_1$ towards $S_0$, that is, as the amount of air fed into the cylinders of the engine is increased, the opening area of the slide valve 17 is gradually increased. In the engine as illustrated in FIG. 2, when the amount of air fed into the cylinders of the engine is small, it is necessary to create a strong swirl motion in the combustion chamber 4 in order to obtain a stable combustion. However, if the amount of air fed into the cylinders of the engine is increased, since a turbulence which is spontaneously caused in the combustion chamber 4 becomes strong, it is necessary to suppress the turbulence, such a strong swirl motion which is naturally caused in the combustion chamber 4. In addition, if the amount of air fed into the cylinders of the engine is further increased, it is necessary to prevent the reduction of the volumetric efficiency, which causes the reduction of the output power of the engine. Consequently, by gradually increasing the opening area of the slide valve 17 as the amount of air fed into the cylinders of the engine is increased, it is possible to prevent the volumetric efficiency from being reduced while suppressing the creation of a swirl motion. Therefore, it is possible to obtain an optimum swirl motion and a high volumetric efficiency independently of the amount of air fed into the cylinders of the engine.

Figure 14:
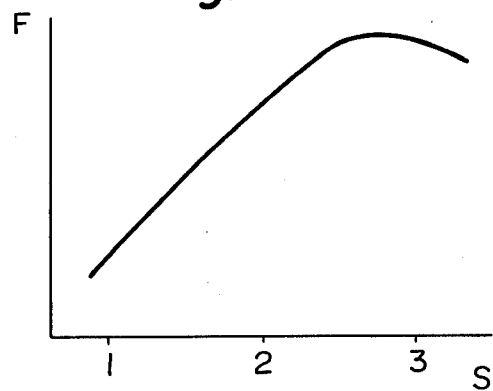
FIG. 14 is a graph illustrating the relationship between the swirl ratio and the stability of the engine idling operation.
Figure 15:
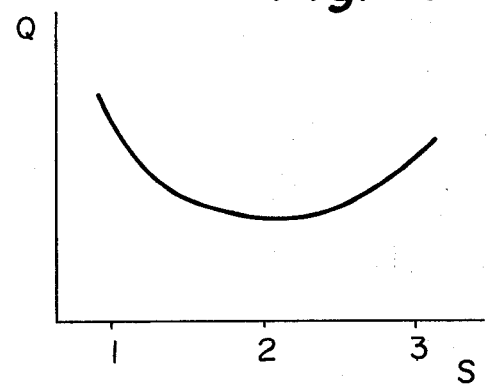
FIG. 15 is a graph illustraing the relationship between the swirl ratio and the specific fuel consumption.
Figure 16:
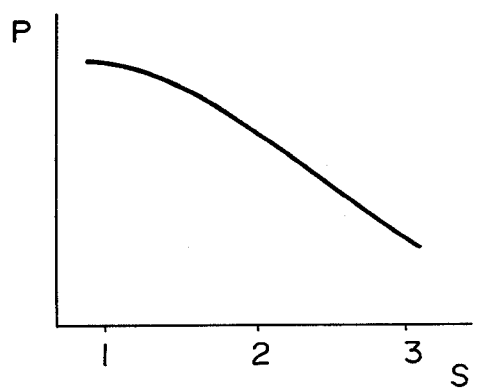
FIG. 16 is a graph illustrating the relationship between the swirl ratio and the maximum output power of the engine.

An optimum swirl ratio will be hereinafter described with reference to FIGS. 14 through 16. The swirl ratio used here means the number of revolutions of a swirl motion per one stroke of the piston. The ordinate F of FIG. 14 indicates the stability of engine idling operation, that is, a reciprocal number of the torque fluctuation, and the abscissa S of FIG. 14 indicates the swirl ratio. From FIG. 14, it will be understood that it is preferable that the swirl ratio S be within the range of 2.5 through 3 in order to obtain an stable idling operation of the engine. The ordinate Q of FIG. 15 indicates a specific fuel consumption in the case where the engine is operating at a middle speed or at a high speed and where the exhaust gas is recirculated into the intake system of the engine, and the abscissa S of FIG. 15 indicates the swirl ratio. From FIG. 15, it will be understood that it is preferable that the swirl ratio S be equal to about 2, and is, the swirl motion be weakened as compared with the case where the engine is operating under an idling state in order to obtain a good specific fuel consumption when the engine is operating at a middle speed or at a high speed. In addition, the ordinate P of FIG. 16 indicates the maximum output power of the engine, and the abscissa S of FIG. 16 indicates the swirl ratio. From FIG. 16, it will be understood that it is preferable that a swirl motion, created when the engine is operating at a high speed under a heavy load, be further weakened so that the swirl ratio S becomes equal to about 1 in order to increase the maximum output power of the engine. Consequently, in order to obtain a stable idling operation and a high output power of the engine while obtaining a good specific fuel consumption, it is preferable that, as the amount of air fed into the cylinders of the engine is increased, the swirl motion be weakened, that is, the swirl ratio S be reduced. In the present invention, as mentioned above, when the amount of air fed into the cylinders of the engine is small, a strong swirl motion is created in the combustion chamber 4, and the swirl motion is weakened as the amount of air fed into the cylinders of the engine is reduced. Therefore, in the present invention, it is possible to control the swirl motion so that an optimum swirl ratio is obtained. In addition, in the present invention, since the bypass passage 14 has a rectangular cross-section, the distance of the movement of the slide valve 17 is proportional to the effective flow area of the bypass passage 14. Consequently, it is possible to easily change the effective flow area of the bypass passage 14 so that it is precisely proportional to the amount of air fed into the cylinders of the engine.

Figure 17:
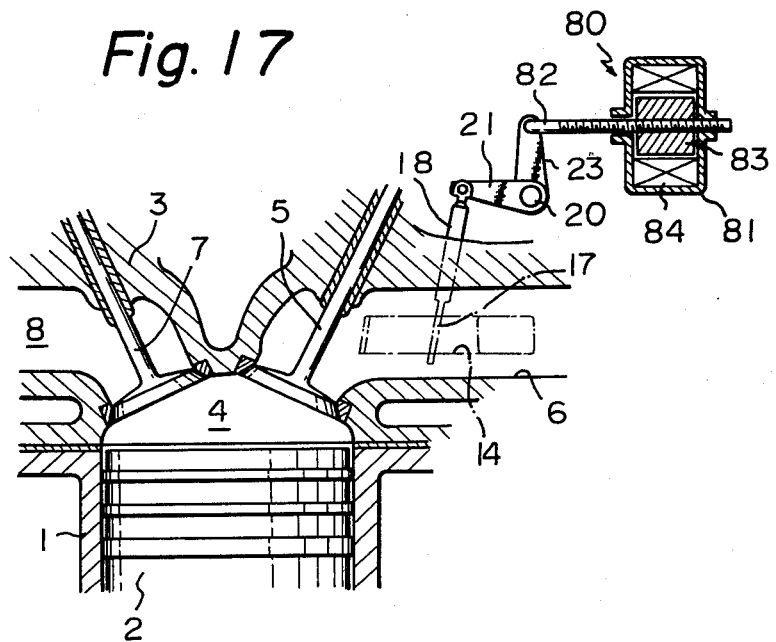
FIG. 17 is a cross-sectional side view of another embodiment according to the present invention.
Figure 18:
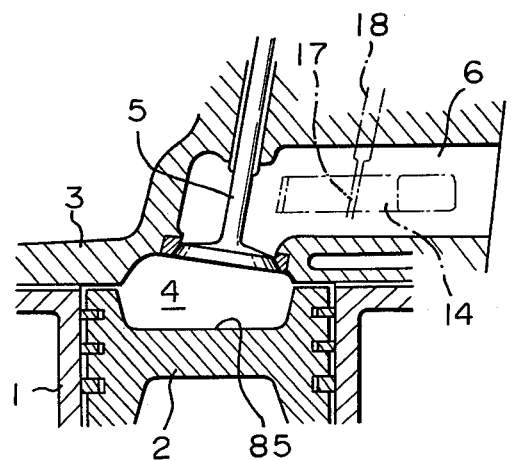
FIG. 18 is a cross-sectional side view of a further embodiment according to the present invention.

FIG. 17 illustrates another embodiment. In this embodiment, instead of adopting the wedge-shaped combustion chamber 4, the semi-spherical-shaped combustion chamber 4 is adopted, and in addition, instead of using the diaphragm apparatus 30 illustrated in FIG. 10, a stepper motor 80 is used. The stepper motor 80 comprises a shaft 82 axially movably, but non-rotatably supported by a housing 81, a rotor 83 having an internal thread which is inengagement with the external thread of the shaft 82, and exciting coils 84 for rotating the rotor 83. One end of the shaft 82 is connected to the tip of the arm 23. In this embodiment, the opening operation of the slide valve 17 is carried out by the step motor 80. In a further embodiment illustrated in FIG. 18, the engine has a Heron-shaped combustion chamber 4 in which the piston 2 has a recess 85 on the top face thereof. Of course, any other type combustion chamber such as a bath tub-shaped combustion chamber may be adopted.

According to the present invention, when the engine is operating at a low speed under a light load, at a low speed under a heavy load, and at a high speed under a light load, since a strong swirl motion is created in the combustion chamber, it is possible to obtain a stable combustion, and it is also possible to suppress the occurence of a knocking particularly when the engine is operating at a low speed under a heavy load. In addition, when the engine is operating at a high speed under a heavy load, since it is possible to obtain a high volumetric efficiency while suppressing the swirl motion, a high output power of the engine can be obtained. Furthermore, when the engine is operating at a middle speed under a middle load, as the amount of air fed into the cylinders of the engine is increased, the swirl motion is weakened. Therefore, at this time, it is possible to obtain an optimum swirl motion and a high volumetric efficiency.

While the invention has been described with reference to specific embodiments chosen for purposes of illustration, it should be apparent that numerous modification could be made thereto by those skilled in the art without departing from the spirit and scope of the invention.

We claim:

1. A device for controlling the flow in a helically-shaped intake port of a cylinder head of an internal combustion engine in order to increase the volumetric efficiency of the engine, said intake port comprising a helical portion around an intake valve, and a substantially straight inlet passage portion tangentially connected to the helical portion and having a helix terminating portion, said device comprising:
   a bypass passage entirely within said cylinder head, said bypass passage having one end directly connected to the inlet passage portion and its other end opening into an upper end of the helix terminating portion of the helical portion such that the flow into the upper end of the helix terminating portion from the bypass portion is in a direction opposite to a swirl flow in the helix terminating portion;
   a slide valve tranversely movable in said bypass passage for controlling the flow area of said bypass passage; and
   actuating means for actuating said slide valve in response to a change in the amount of air fed into the intake port for increasing the flow area of said bypass passage in proportion to an increase of said amount of air, the opening of the valve reducing the swirl flow and thereby increasing the volumetric efficiency.

2. A device according to claim 1, wherein said bypass passage has a rectangular cross-section.

3. A device according to claim 1, wherein said bypass passage has an outlet opening which is open to the helical portion at a position near a top wall of the helical portion.

4. A device according to claim 3, wherein the top wall of helical portion has a steeply inclined wall portion at the helix terminating portion, the outlet opening of said bypass passage being arranged near said steeply inclined wall portion.

5. A device according to claim 1, wherein the intake passage portion has an inlet open end located furthest from the helical portion, said bypass passage having an inlet opening which is open to the inlet passage portion at a position near said inlet open end.

6. A device according to claim 5, wherein the intake passage portion comprises an upper wall, a bottom wall, a first side wall located near the intake valve and a second side wall located remote from the intake valve, said first side wall comprising a downwardly inclined portion located near the helical portion, and a substantially vertical portion located near said inlet open end, the inlet opening of said bypass passage being formed on said vertical portion.

7. A device according to claim 6, wherein the intake port comprises a valve guide projecting into the helical portion from an upper wall of the helical portion and having a circumferential wall, said downwardly inclined portion being tangentially connected to the circumferential wall of said valve guide.

8. A device according to claim 1, wherein said actuating means comprises a control device determining a desired opening area of said slide valve, which is proportional to said amount of air, on the basis of said amount of air and producing a control signal, and an actuator actuating said slide valve in response to said control signal for equalizing the opening area of said slide valve to said desired opening area.

9. A device according to claim 8, wherein said actuator comprises a stepper motor connected to said slide valve and actuated in response to said control signal.

10. A device according to claim 8, wherein said desired opening area is a fixed minimum value when said amount of air is smaller than a predetermined first value, said desired opening area being a fixed maximum value when said amount of air is larger than a predetermined second value which is larger than said first value.

11. A device according to claim 10, wherein said minimum value is equal to zero.

12. A device according to claim 8, wherein said control device comprises a memory in which said desired opening area is stored, and a detecting device detecting the present opening area of said slide valve and producing a detecting signal, said control device calculating the difference between said desired opening area and said present opening area and producing said control signal which causes the reduction of said difference.

13. A device according to claim 12, wherein said control device comprises an engine speed sensor detecting the engine speed and producing a detecting signal, a vacuum sensor detecting the level of vacuum in the intake port and producing a detecting signal, and an electronic control unit calculating said amount of air from the detecting signals of said engine speed sensor and said vacuum sensor and calculating said difference from the detecting signal of said detecting device and said desired opening area stored in said memory.

14. A device according to claim 12, wherein said detecting device comprises a potentiometer connected to said slide valve.

15. A device according to claim 8, wherein said actuator comprises a vacuum source, a vacuum operated diaphragm apparatus connected to said slide valve and having a vacuum chamber, and an electromagnetic control valve arranged between said vacuum source and said vacuum chamber and actuated in response to said control signal for controlling the level of vacuum in said vacuum chamber.

16. A device according to claim 15, wherein said electromagnetic control valve comprises an atmospheric port interconnecting said vacuum chamber to the atmosphere, a vacuum port interconnecting said vacuum chamber to said vacuum source, and a valve body alternately closing said atmosphere port and said vacuum port, said control signal having continuous pulses which determines the length of time during which said valve body closes said atomspheric port and said vacuum port.

17. A device according to claim 15, wherein said vacuum source comprises a vacuum accumulator connected to said vacuum chamber, and a check valve allowing only the outflow of air from said vacuum accumulator into the intake port.

* * * * *